Nov. 27, 1962　　　　　J. S. CASE　　　　　3,065,903
CALCULATING INSTRUMENT
Filed May 20, 1957　　　　　　　　　　　　　　2 Sheets-Sheet 1

INVENTOR
JOHN S. CASE

BY　*Raphael Semmes*

ATTORNEY

Nov. 27, 1962  J. S. CASE  3,065,903
CALCULATING INSTRUMENT
Filed May 20, 1957  2 Sheets-Sheet 2
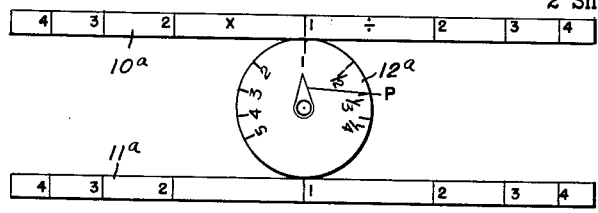
FIG. 3
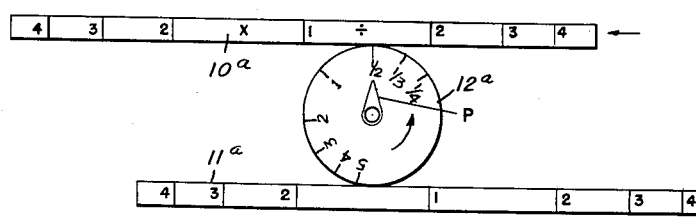
FIG. 3A
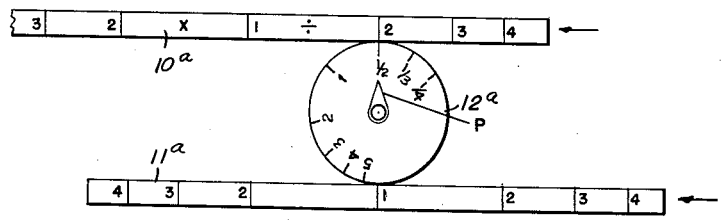
FIG. 3B
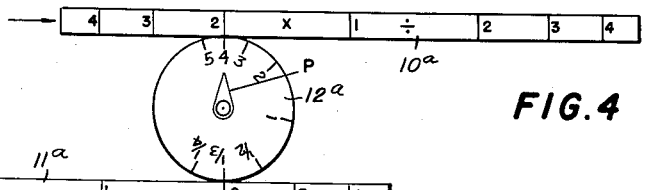
FIG. 4
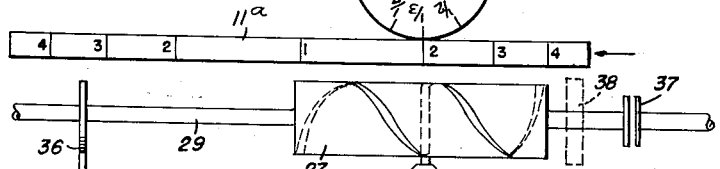
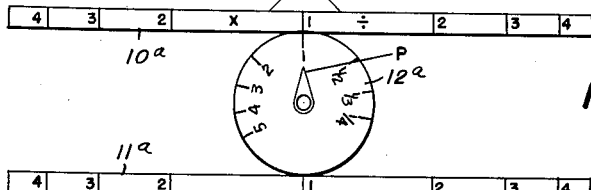
FIG. 5
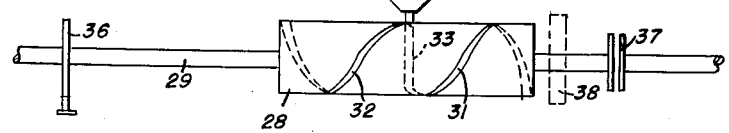
INVENTOR
*JOHN S. CASE*
BY *Raphael Semmes*
ATTORNEY

United States Patent Office 3,065,903
Patented Nov. 27, 1962

3,065,903
CALCULATING INSTRUMENT
John S. Case, 210 Regester Ave., Rogers Forge,
Baltimore 12, Md.
Filed May 20, 1957, Ser. No. 660,389
4 Claims. (Cl. 235—61)

This invention relates to a calculating instrument which operates on the basic principle of a slide rule to record the sum or difference of two logarithmic values, and makes possible the direct reading of either the quotient or the product, depending upon the result desired and the selective manipulation of the mechanism. More particularly, the invention consists in new and useful improvements in a calculating device wherein the motion of a pinion, operatively connected between two ring gears or the like, is employed as the basis for determining the result, coupled with compensation for the orbital translation of the rotating pinion.

An object of the invention is to provide a calculating instrument of this nature which may be operated either manually or automatically, in either case arriving at any result within the range of the instrument, without requiring interpretation or allowing for the possibility of error, thereby making the instrument desirable as a direct reading instrument which may be used by persons without special training or skill.

Another object of the invention is to provide a calculating instrument wherein a common rotating member, coacting with two other movable members, is adapted to directly indicate the sum or differences of the displacements of the last-named members from an initial position, said displacements bearing a logarithmic relationship to the inputs to said moving members, said instrument including means for indicating the amount of rotation of the rotating member and means for compensating for the bodily displacement of the rotating member so that it does not affect the final reading of the instrument.

A further object of the invention is to provide a calculating instrument of this nature, adapted for such use as in calculating the average speed of a vehicle between two points, the average flow of fluids over a given time, the average production of a machine and similar calculations.

With the above and other objects in view, which will appear as the description proceeds, the invention consists in the novel features herein set forth, illustrated in the accompanying drawings and more particularly pointed out in the appended claims.

Referring to the drawings in which numerals of like character designate similar parts through the several views:

FIGURE 3 is a graphic view designed to illustrate the principle of operation of the invention and showing the two movable members and the interconnected rotating member in initial positions;

FIGURE 3A is a similar view illustrating the relative positions of the parts of the instrument upon the movement of one of the movable members with the other movable member remaining stationary;

FIGURE 3B is a similar view showing the relative positions of the parts upon movement of both movable members in the same direction;

FIGURE 4 is a graphic view of a still further manipulation of the instrument, showing the relative positions of the parts when the two movable members are moved in opposite directions; and FIGURE 5 is a graphic view along the lines of FIGURES 3-4, illustrating the method of imparting movement to the two movable members as illustrated in FIGURES 1 and 2.

Figure 1:
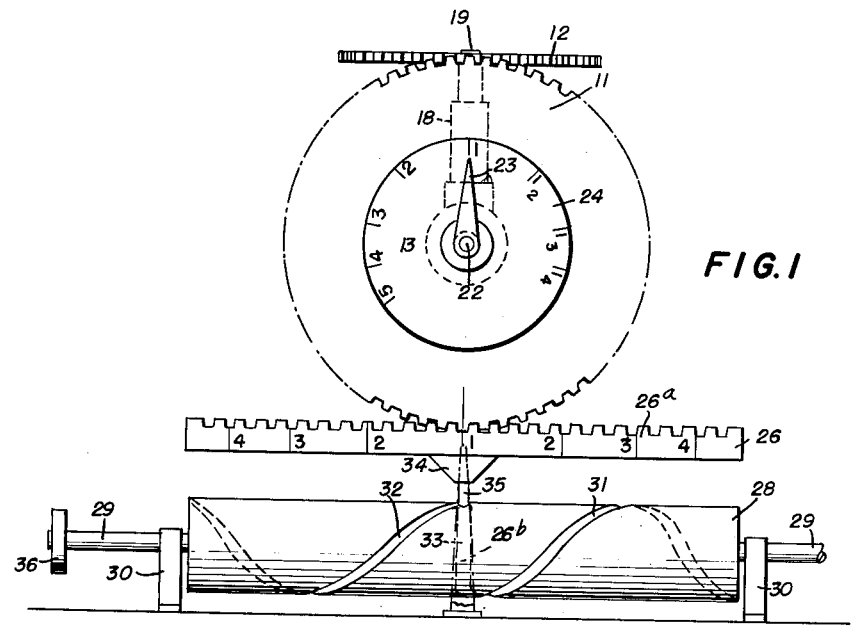
FIGURE 1 is a front elevational view diagrammatically illustrating one embodiment of the invention.
Figure 2:
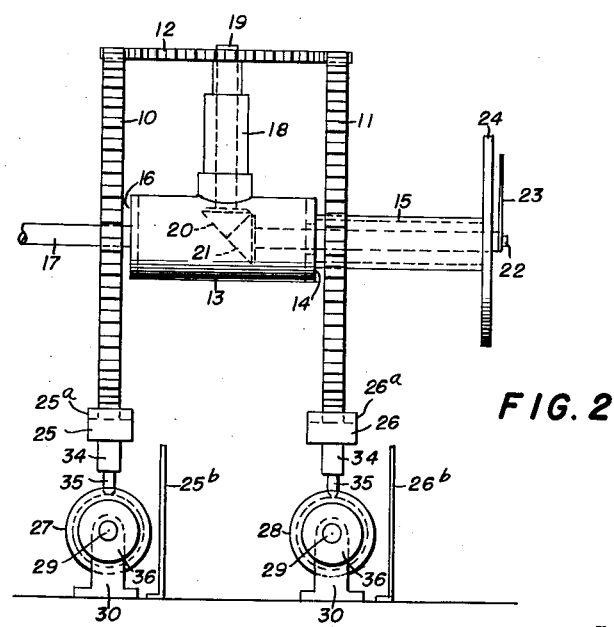
FIGURE 2 is a side elevational view taken at right angles to FIGURE 1.

In the drawings, referring to the illustrative embodiment of the invention shown in FIGURES 1 and 2, a pair of spaced, parallel ring gears 10 and 11, identical in size, are coaxially mounted for coaction with an intervening pinion 12. A cylindrical housing 13 is coaxially interposed between the ring gears 10 and 11 and one end thereof is affixed as at 14 to a hollow shaft 15 which projects coaxially through and rotates freely within the ring gear 11. The opposite end of the housing 13 is affixed as at 16 to a coaxial shaft 17 which projects freely through the opposite ring gear 10, so as to permit relative rotation.

A neck portion 18 projects at right angles to the housing 13 and rotatably receives a shaft 19, the upper end of which carries the pinion 12. The inner end of the shaft 19 carries a bevel gear 20 which meshes with a complementary bevel gear 21 fixed to the inner end of a shaft 22 which is rotatably supported within the hollow shaft 15 and carries at its outer end an indicator 23. A calibrated dial 24, arranged coaxially with the shafts 22 and 15, is affixed to the latter for rotation therewith.

Thus, relative rotation of the ring gears 10 and 11 is reflected by the rotation and orbital translation of pinion 12 through the respective engaging gear teeth and in turn, through the shaft 19, bevel gears 20 and 21, and central shaft 22, by the rotation of indicator 23 relative to dial 24. At the same time, any angular movement of the pinion 12 about the axis of the ring gears 10 and 11, caused by the relative rotation of the ring gears, is translated through the housing 13 and hollow shaft 15 to the calibrated dial 24. The rotation of the pinion 12, being proportional to the difference of rotation of the ring gears 10—11, it is necessary that the dial 24 be calibrated logarithmically so that the answers may be read directly.

Although various means may be employed for affecting relative movement or setting of the ring gears 10 and 11, one such means contemplated by the present invention comprises a pair of parallel, horizontally disposed racks 25 and 26 having a series of teeth on their upper faces for operative engagement with the peripheral teeth of the ring gears 10 and 11, respectively. The racks 25 and 26 may be supported by any suitable means for horizontal reciprocating movement and their front faces 25a and 26a, respectively, may be calibrated for indicating their extent of movement in either direction, as best seen in FIGURE 1.

Beneath the respective racks 25 and 26 are located cylindrical drums 27 and 28, arranged parallel with the racks and with each other. These drums are supported on shafts 29 rotatably mounted in brackets or trunnions 30. The peripheries of the drums are provided with logarithmic spiral recesses 31 and 32, respectively, extending to opposite ends of the drums, from a central groove portion 33 extending around the periphery of each drum in a plane at right angles to the axis of the drum. A depending lug 34 is fixed to the underside of each of the racks 25 and 26 and carries a downwardly projecting finger 35 which is adapted to ride in the peripheral grooves of the respective drums 27 and 28.

Thus, rotary movement of either drum is translated into longitudinal shifting movement of its associated rack which in turn causes rotary movement of the respective ring gears 10 and 11. The peripheral dimensions of the ring gears 10 and 11 and of the pinion 12 are so related to the logarithmic scale on the dial 24 that the latter in conjunction with the indicator 23, directly reflects the sum or differences of the displacements of the ring gears from an initial position and compensates for the angular displacement of the pinion 12 about the axis of the ring gears 10 and 11, thereby indicating the result directly.

In order to gauge the horizontal shifting movement of the racks 25 and 26, fixed upright markers 25b and 26b may be provided adjacent the calibrated faces of respective racks. Also, in order to automatically return the drums 27 and 28 to their starting points, an over-riding spring 36 may be provided on each of the shafts 29. These springs are shown diagrammatically in the drawings but it will be understood that rotation of the drums in either direction develops a corresponding tension on the respective over-riding springs 36, so that upon release of the drums, the springs automatically reverse their rotation until the fingers 35 depending from the respective racks reach the central grooves 33, when the racks 25 and 26 are returned to their starting points.

In order to simplify the explanation of the operation of this instrument, FIGURES 3-5 are designed to present a graphic illustration of the various steps and results. Referring first to FIGURE 3, let us consider the ring gear 10, previously referred to, as having infinite radius and appearing as scale 10a in FIGURE 3. Similarly, ring gear 11 would appear as scale 11a and pinion 12, as dial 12a. The reading at the beginning and at the conclusion of the operation is indicated by the pointer P. Thus, in FIGURE 3, scales 10a and 11a are set to position 1 and since 1×1 equals 1 and 1 divided by 1 equals 1, dial 12a and pointer P must read 1.

In FIGURE 3A, scale 10a has been advanced to the left a distance equal to log 2 while scale 11a has not been moved and remains at log 1. It will be seen that dial 12a has undergone rotation proportional to the distance scale 10a has been moved and dial 12a has undergone translation equivalent to one-half the distance from 1 to 2 on scale 10a. It is this translation that must be compensated in the design of the instrument. Disregarding translation, dial 12a indicates the quotient $$\frac{11a}{10a}$$

or one-half. In FIGURE 3B, the scale 10a has been advanced to the left to log 4 while scale 11a has also been advanced in the same direction to log 2. As a result, the dial 12a still reads quotient $$\frac{11a}{10a} \text{ equals } \frac{2}{4} \text{ equals } \frac{1}{2}$$

although it has undergone twice as much translation. Here again, translation had to be compensated.

In FIGURE 4, it will be seen that scale 10a has moved to the right a distance equal to log 2 while scale 11a has moved to the left a distance equal to log 2. Dial 12a has suffered rotation proportional to the sum of log 2 plus log 2 and therefore indicates the result of the addition as the product of 2×2 or 4. In this case, no translation happens to be present, as scales 10a and 11a have moved equal distances in opposite directions and dial 12a has been rotated without angular displacement.

It will be apparent that if the motions of the scales 10a and 11a are in the same direction, the difference in the magnitudes of their motions results in a quotient, while if same motions were in opposite directions, the sum of their motions is indicated by the dial 12a as a product. In either case, the logarithmic calibrations on the dial are so related to the degree of movement of the scales and the angular movement of the dial 12a as to reflect the logarithmic difference in the magnitude of movement of the scales and compensate for angular movement of the dial.

FIGURE 5 is a generally similar graphic illustration showing the drum means 27 and 28 for affecting relative movement of the scales 10a and 11a. The groove 31—32 in the periphery of the drum is so designed that one revolution of the drum advances the scale cooperating therewith, a distance equal to log, 2, 3, 4, etc. as the drum makes successive revolutions. The straight central portions 33 of the grooves allow adjustment to enable the drum to rotate a distance from log 0 to log 1 without moving the scale, since log 0 would be infinite. This portion of the grove also provides for 0 setting. As before stated, the over-riding springs 36 urge the drums to their 0 positions.

Input to the drums 27, 28 is through the respective shafts 29 and clutches 37 may be provided for causing the rotation of the shafts 29 from any suitable source. Upon disengagement of the clutches 37, the drums may be manually operated by knurled dials 38. The clutches 37 may be so constructed as to be manually or automatically disengaged to allow the drums 27 and 28 to automatically return under the tension of their respective springs 36 when the drums reach the limit of their design.

From the foregoing, it is believed that the invention may be readily understood by those skilled in the art, without further description, it being borne in mind that numerous changes may be made in the details of construction without departing from the spirit of the invention as set forth in the following claims.

I claim:

1. A calculating instrument, comprising, two main gear members coaxially mounted in laterally spaced relation for independent rotary movement, logarithmically operated racks operatively connected to respective main gear members for causing rotation of the latter in either direction, a differential gear interconnecting said main gear members, a shaft perpendicular to the axis of rotation of said main gear members supporting said differential gear, a bevel gear on the opposite end of said perpendicular shaft, a second shaft arranged coaxially with respect to said main gear members, and extending freely through one main gear, a complementary bevel gear on one end of said second shaft and operatively engaging said first named bevel gear, a housing enclosing said bevel gears and rotatably supporting the adjacent ends of said shafts, said housing being rotatable independently of said main gear members upon the angular displacement of said differential gear resulting from the differential rotation of said main gears, tubular dial supporting means fixed coaxially to said housing and rotatably surrounding said second shaft and projecting freely through said one main gear member, a calibrated dial fixed to and rotatable with the projecting end of said tubular dial supporting means, a movable pointer fixed to the outer end of said second shaft and adapted to coact with the calibrations on said dial, said dial being graduated for directly reading in cooperation with the pointer the desired result of the computation as produced by the amount of rotation of respective main gears in either direction and simultaneously compensating for the bodily angular displacement of said differential gear, caused by the differential rotation of said main gears.

2. A calculating instrument, comprising, two main gear members coaxially mounted in laterally spaced relation for independent rotary movement, a differential gear interconnecting said main gear members, a shaft perpendicular to the axis of rotation of said main gear members supporting said differential gear, a bevel gear on the opposite end of said perpendicular shaft, a second shaft arranged coaxially with respect to said main gear members, and extending freely through one main gear, a complementary bevel gear on one end of said second shaft and operatively engaging said first named bevel gear in a one to one ratio, a housing enclosing said bevel gears and rotatably supporting the adjacent ends of said shafts, said housing being rotatable independently of said main gear members upon the bodily angular displacement of said differential gear resulting from the differential rotation of said main gears, tubular dial supporting means fixed coaxially to said housing and rotatably surrounding said second shaft and projecting freely through said one main gear member, a calibrated dial fixed to and rotatable with the projecting end of said tubular dial supporting means, a movable pointer fixed to the outer end of said second shaft and adapted to coact with the calibrations on said dial, said dial being graduated for directly reading in cooperation with the pointer the desired result of the computation as produced by the amount of rotation of respective main gears in either direction and simultaneously compensating for the bodily angular displacement of said differential gear, caused by the differential rotation of said main gears.

3. A calculating instrument, comprising, two main gear members coaxially mounted in laterally spaced relation for independent rotary movement, means operatively connected to respective main gear members for causing rotation of the latter in at least one direction, a differential gear interconnecting said main gear members, a shaft perpendicular to the axis of rotation of said main gear members supporting said differential gear, a bevel gear on the opposite end of said perpendicular shaft, a second shaft arranged coaxially with respect to said main gear members, and extending freely through one main gear, a complementary bevel gear on one end of said second shaft and operatively engaging said first named bevel gear, a housing enclosing said bevel gears and rotatably supporting the adjacent ends of said shafts, said housing being rotatable independently of said main gear members upon the bodily angular displacement of said differential gear resulting from the differential rotation of said main gears, tubular dial supporting means fixed coaxially to said housing and rotatably surrounding said second shaft and projecting freely through said one main gear member, a calibrated dial fixed to and rotatable with the projecting end of said tubular dial supporting means, a movable pointer fixed to the outer end of said second shaft and adapted to coact with the calibrations on said dial, said dial being graduated for directly reading in cooperation with the pointer the desired result of the computation as produced by the amount of rotation of respective main gears in at least one direction and simultaneously compensating for the bodily angular displacement of said differential gear, caused by the differential rotation of said main gears.

4. A calculating instrument, comprising, two main gear members coaxially mounted in laterally spaced relation for independent rotary movement, logarithmically operated racks operatively connected to respective main gear members for causing rotation of the latter in either direction, a differential gear interconnecting said main gear members, a shaft perpendicular to the axis of rotation of said main gear members supporting said differential gear, a bevel gear on the opposite end of said perpendicular shaft, a second shaft arranged coaxially with respect to said main gear members, and extending freely through one main gear, a complementary bevel gear on one end of said second shaft and operatively engaging said first named bevel gear, a housing enclosing said bevel gears and rotatably supporting the adjacent ends of said shafts, said housing being bodily rotatable independently of said main gear members upon the angular displacement of said differential gear resulting from the differential rotation of said main gears, tubular dial supporting means fixed coaxially to said housing and rotatably surrounding said second shaft and projecting freely through said one main gear member, a calibrated dial fixed to and rotatable with the projecting end of said tubular dial supporting means, a movable pointer fixed to the outer end of said second shaft and adapted to coact with the calibrations on said dial, said dial being graduated for reading in cooperation with the pointer the amount of rotation of said differential gear about the axis of said perpendicular shaft as produced by the amount of rotation of respective main gears in either direction and simultaneously compensating for the bodily angular displacement of said differential gear, caused by the differential rotation of said main gears.

References Cited in the file of this patent

UNITED STATES PATENTS

| 1,746,130 | Ruhling | Feb. 4, 1930 |
| 2,759,668 | Hielle | Aug. 21, 1956 |

FOREIGN PATENTS

| 627,729 | France | June 14, 1927 |
| 650,084 | France | Sept. 11, 1927 |
| 231,619 | Great Britain | Apr. 9, 1925 |
| 480,135 | Great Britain | Feb. 17, 1938 |
| 722,261 | Great Britain | Jan. 19, 1955 |